ND_ELECTRODE SUBMERGED ARC WELDING
United States Patent

[11] 3,571,553

[72] Inventors Tomokazu Godai;
Makoto Tomita; Osamu Tanaka,
Kamakura-shi, Japan
[21] Appl. No. 788,240
[22] Filed Dec. 31, 1968
[45] Patented Mar. 23, 1971
[73] Assignee Kobe Steel, Ltd.
Kobe, Japan
[32] Priority Jan. 9, 1968
[33] Japan
[31] 43/966

[54] BAND ELECTRODE SUBMERGED ARC WELDING OF CHROMIUM STAINLESS STEEL AND A MATERIAL USED IN SAID WELDING
1 Claim, No Drawings

[52] U.S. Cl. ................................................. 219/73, 219/145
[51] Int. Cl. ..................................................... B23k 9/18, B23k 25/00, B23k 35/00
[50] Field of Search ........................................... 219/73, 145

[56] References Cited
UNITED STATES PATENTS
3,320,100   5/1967   Coless .......................... 219/73

Primary Examiner—J. V. Truhe
Assistant Examiner—Lawrence A. Rouse
Attorney—Wenderoth, Lind and Ponack ABSTRACT: The band electrode submerged arc-welding of chromium stainless steel, a weld metal which is excellent in ductility and crack resistance can be obtained by means of using a band electrode of chromium stainless steel in combination with a flux containing 25 to 50 percent calcium carbonate, 30 to 50 percent alumina, 1 to 10 percent fluorite, and 1 to 10 percent magnesia, said electrode and/or flux being blended with aluminum, titanium, columbium, nitrogen, chromium, manganese, and nickel or cobalt, so that the weld metal contains these elements in the ratio of 0.015 to 0.15 percent aluminum, 0.0025 to 0.22 percent titanium, 0.35 to 2,8 percent columbium, 0.01 to 0.075 percent nitrogen, 8.5 to 25 percent chromium, 0.15 to 2.0 percent manganese, and less than 2.8 percent nickel or cobalt.

BAND ELECTRODE SUBMERGED ARC WELDING OF CHROMIUM STAINLESS STEEL AND A MATERIAL USED IN SAID WELDING

BACKGROUND OF THE INVENTION

It is publicly known from Japanese Pat. No. 496,511 that in the welding of high-chromium stainless steel, aluminum, titanium or columbium can be contained to prevent the lowering of ductility and impact value of welded metal. And also, as shown in Japanese Pat. No. 466,586, the composition having the ingredients in the following range has well been known as a flux for submerged arc-welding of high-chromium stainless steel:

Wollastonite   10—30 percent
Fluorite   10—20 percent
Calcium carbonate   20—40 percent
Potash feldspar   3—15 percent
Cryolite   1—10 percent
Aluminum fluoride   10—30 percent
Ferromanganese   1—10 percent
Ferrocolumbium   1—10 percent
Ferroaluminum   1—10 percent
Ferrotitanium   1—10 percent
Metallic Titanium   1—5 percent In general, in the submerged arc-welding using band electrode of 0.2 to 0.8 mm. in thickness and 20 to 100 mm. in width, a smooth bead of 20 to 100 mm. in width and less penetration can be efficiently obtained in the course of one pass. However, in the submerged arc-welding of high-chromium stainless steel with the use of the band electrode, even if the conventional flux for submerged arc-welding is employed, the practically usable good bead and mechanical properties could not be obtained. That is, in case of the conventional flux containing silicon oxide, the silicon oxide was reduced due to a strong deoxidizing action of aluminum, titanium and columbium, and the weld metal was made to contain a great amount of silicon, and ductility of the weld metal was almost lost, even though the bead shape as well as workability was satisfactory, thus being far from practical use. Also, in case of a blending in that the flux to be used contains little silicon oxide, an undercut occurred at the bead ends, the bead rough face was uneven, and detachability of slag being inferior, it was difficult to obtain a satisfactory bead.

The inventors of this invention, after a series of experimental studies, have been able to practicalize the highly basic flux for submerged arc-welding free from the above-indicated defects, and have finally come to succeed in the development of a material for band electrode submerged arc-welding, which is excellent in workability, and is capable of obtaining a welded portion excelled in ductility and crack resisting property by combining the flux and the band electrode being the specific ingredient.

SUMMARY OF THE INVENTION

The present invention is concerned with a submerged arc-welding of chromium stainless steel and a material used in said welding.

That is to say, the band electrode submerged arc-welding of chromium stainless steel in the process of the present invention is characterized by using a band electrode of chromium stainless steel in combination with the flux containing 25—50 percent calcium carbonate, 30—50 percent alumina, 1—10 percent fluorite, and 1—10 percent magnesia, said electrode and/or flux being blended with aluminum, titanium, columbium, nitrogen, chromium, manganese, and nickel or cobalt, so that the weld metal contains these elements in the ratio of 0.015—0.15 percent aluminum, 0.025—0.22 percent titanium, 0.35—2.8 percent columbium, 0.01—0.075 percent nitrogen, 8.5—25 percent chromium, 0.15—2.0 percent manganese, and less than 2.8 percent nickel or cobalt.

Furthermore, a welding material to be used the process of this invention is characterized by the combination of a band electrode of chromium stainless steel and a flux containing 25—50 percent calcium carbonate, 30—50 percent alumina, 1—10 percent fluorite and 1—10 percent magnesia, in that said electrode and/or flux being blended with alloy elements such as aluminum, titanium, columbium, nitrogen, chromium manganese, nickel or cobalt in the following ratio:

a. when the alloy elements are blended in the flux:
   aluminum   0.5—5 percent
   titanium   1—5 percent
   columbium   1—7 percent
   nitrogen   0.025—0.25 percent
   chromium   not more than 30 percent
   manganese   1—7 percent
   nickel or cobalt   0.5—5 percent b. when above-indicated alloy elements are blended in the band electrode:
   aluminum   0.3—4 percent
   titanium   0.5—4 percent
   columbium   0.5—4 percent
   nitrogen   0.02—0.15 percent
   chromium   11—30 percent
   manganese   0.4—5 percent
   nickel or cobalt   0.2—3.5 percent c. when above-indicated alloy elements are blended into both the flux and band electrode:
   aluminum   0—5 percent
   titanium   0—5 percent
   columbium   0—7 percent
   nitrogen   0—0.25 percent
   chromium   0—30 percent
   manganese   0—7 percent
   nickel or cobalt   0—5 percent
in the flux, and adding
   aluminum   0—3 percent
   titanium   0—4 percent
   columbium   0—4 percent
   nitrogen   0—0.15 percent
   chromium   0—30 percent
   manganese   0—5 percent
   nickel or cobalt   0—3.5 percent
in the band electrode.

It should be noted, however, that (c) is not limited to the case in that all of the above-indicated alloy elements are blended separately in the flux and in the electrode respectively, but on the contrary, some of those elements can be blended in only either one of the two. Similarly, the blending combination in case of blending them separately in the two can be carried out on an optional basis within the required range of the blending ratio. Nevertheless, it goes without saying that said blending combination should be conducted so as not to deviate from the above-indicated alloy element component range in the weld metals.

Incidentally, columbium is difficult to be separated from tantalum belonging to the same group as the former, and because it always is accompanied by tantalum, "columbium" referred to in the specification of this application will be considered to contain a certain amount of tantalum (that is, columbium + tantalum).

DETAILED EXPLANATION OF THE PREFERRED EMBODIMENT

Hereinbelow is the explanation in detail as to the reason why the welding method and the material thereof in a process of the present invention is specified as in the foregoing.

The flux in the present invention is characterized by being a flux having strong basicity with calcium carbonate and alumina as the basis thereof. Calcium carbonate acts effectively in intercepting arc from the atmosphere by means of reducing atmosphere of carbon dioxide gas generated by thermal decomposition, and at the same time, calcium oxide which is a decomposed product thereof contributes to form a strong basic slag along with said alumina. At such time, when the blending amount of calcium carbonate is less than 25 percent, the fluidity of slag is deteriorated, and when it is more than 50 percent, there is much generation of gas, and results in the worsening of bead appearance. Therefore, the blending ratio should be limited to the range of 25—50 percent.

Further, alumina acts effectively to maintain the melting point of slag low by the blending of more than 25 percent. It should be noted, however, that a great amount of blending will raise the fluidity of slag on the contrary, thus resulting in instability of arc, and consequently, the blending should be not more than 50 percent.

In addition to the basic flux components, 1—10 percent fluorite, and 1—10 percent magnesia are blended, because by blending-in of fluorite in the amount greater than 1 percent, it is capable of making the weld penetration thin, and eliminating the overlapping about the ends of bead. Also because a blending of more than 10 percent will cause such occurrences as undercut or the like, the maximum blending percentage should be the said value. In the meantime, even though magnesia contributes to the stabilization of arc and improvement in the detachability of slag, even the blending of less than 1 percent cannot bring about the intended effect, while the blending of more than 10 percent will thicken the weld penetration, resulting in frequent occurrence of slag baking, which is not suitable to the buildup welding portion. In order to expect the best possible result, therefore, the blending ratio is limited to the range as explained above.

In the following an explanation is given specifically as to the object of adding such alloy elements as aluminum, titanium, columbium, nitrogen, chromium, manganese and nickel or cobalt to the weld metals in the process of the present invention. In the first place, the addition of aluminum, titanium and columbium is effected in an aim to expect the function as deoxidizing agents, and at the same time, by the addition of these components into the weld metals, to finely divide the crystalline particles, and to improve the ductility and crack resisting property thereof. And in the band electrode submerged arc-welding, input becomes large due to employment of electric current of 300 A.—1,600 A., the shield of arc atmosphere due to gas generated from welding is nearly complete, and the amount of nitrogen from air is smaller compared with the case of manual welding. Because of this, aluminum, titanium and columbium alone would not be sufficient to carry out the finely dividing of the crystalline particles. Furthermore, in order to finely divide the crystalline particles, it is imperative to forcedly produce nitrides from aluminum, titanium, columbium and nitrogen by adding nitrogen to the weld metals. In the meantime, the addition of nickel or cobalt and manganese will contribute to the increase of ductility about the part to be welded, and is carried out with the aim of improving the crack resisting property. On the other hand, an optional amount of chromium in the weld metal suitable to the purpose may be added in order to obtain the desired value depending on the use. In order to add the alloy elements into the weld metal as explained in the foregoing, and to accomplish the purpose of object above, it is necessary to establish the ratio of addition of above-indicated respective alloy elements into the weld metal due to the following reasons.

That is to say, aluminum and titanium are not capable of exhibiting the intended effect when the respective percentage is less than the above-indicated range due to oxidation wear. And when the percentage is above the upper limit, aluminum and titanium amount in the weld metal becomes excessively large, resulting in lowering the ductility. On the other hand, the addition of columbium is aimed at solidifying carbon in the weld metal as columbium carbide, and to prevent martensite from separation. However, the blending amount below the lower limit does not exhibit the intended effect sufficiently, and similarly when it is above the upper limit, the metal will be made brittle. Therefore, such blending above or below the limit must be avoided. Nickel or cobalt and manganese exhibit the above-mentioned effect by blending above the upper limit. However, when these elements are added in a great amount, the former will be a cause of hardening at the time of after-heat treatment, while the latter will also harden the weld metal, and therefore, no blending above the upper limit is preferable. Nitrogen also exhibits the above-shown effect in case of blending above the lower limit, but when blended above the upper limit, the amount of gas to be generated will be great, which will be a cause of defects on the bead face, and therefore, such blending above the upper limit is not preferable.

In the meantime, chromium will be blended in an optional amount, and the blending ratio will be established taking into consideration the amount of high-chromium stainless steel put to practical use at present. In order to carry out the addition of above-indicated respective alloy elements into the weld metal so as to maintain the range of composition as shown in the foregoing paragraphs, the intended object can be sufficiently accomplished by (a) blending said respective alloy elements into only the flux, or (b) into only the band electrode, or (c) by blending one or more of the alloy elements into both the flux and the band electrode. And also in this respect, after a series of experimental researches, the inventors of this invention have come to practicalize the welding material by establishing the most appropriate blending ratio for each one of the above-indicated cases of (a), (b) and (c).

Incidentally, above-shown blending ratio has been established on the basis of providing the respective alloy elements from the flux and/or the band electrode into the weld metal. And thus, the amount of yield has been obtained as a result of respective experimental researches conducted by the inventors et al. of this invention. The table in the following shows the amount of yield.

A. Yield obtained when provided from the flux
 aluminum    about 3 percent
 titanium    2—5 percent
 columbium    35—40 percent
 chromium    about 80 percent
 manganese    15—30 percent
 nickel or cobalt    30—55 percent B. Yield obtained from the band electrode
 aluminum    about 5 percent
 titanium    about 5 percent
 columbium    about 70 percent
 nitrogen    about 50 percent
 chromium    about 75 percent
 manganese    about 40 percent
 nickel or cobalt    about 80 percent (The yield referred to in the above is a value determined by consideration of the welding ratio with the base metal, and also of the consumption ratio or the band electrode and flux.) Incidentally, in case of blending calcium, titanium, columbium or the like into the flux, it will be effective to blend a amount corresponding to the above-indicated blending ratio as shown in the following in the form of iron alloy. And further, it is possible to blend nitrogen in the form of metal compound or others containing nitrogen.

ferroaluminum (50 percent Al)    1—10 percent
 ferrotitanium (45 percent Ti)    2.2—11 percent
 ferrocolumbium (70 percent Cb)    1.4—10 percent
 chromium nitride (5 percent N)    0.5—5 percent The following will show the working embodiments of the present invention.

EXAMPLE 1

(When alloy elements are added only to the flux)
1. Welding material
 a. flux to be used
 calcium carbonate    31 percent
 alumina    31 percent
 fluorite    2.5 percent
 magnesia    56 percent
 ferroaluminum (50 percent Al)    3 percent
 ferrotitanium (45 percent Ti)    3 percent
 ferrocolumbium (70 percent Cb)    5.5 percent
 chromium nitride (5 percent N)    2.5 percent metallic nickel   2 percent
metallic manganese   3 percent
metallic chromium   3.5 percent When water glass was added to these raw materials, which were mixed well, and were sintered to be granulated at a temperature of 450° C.

b. band electrode to be used
(0.4×50 mm.)
Cr   16.4 percent
Mn   0.5 percent
Si   0.5 percent
C   0.06 percent
Ni   0.1 percent
N   0.02 percent
Fe   Balance c. base metal to be used
C   0.18 percent
Si   0.1 percent
Mn   0.5 percent
Fe   Balance 2. Welding conditions for use As a result of carrying out the band electrode submerged arc-welding on a soft steel plate under above given conditions, it was found out that a smooth bead of superior quality having less welding thickness of about 50 mm. was obtained, and the slag detached itself. In the meantime, there was no such defects as undercut observed at all about the bead ends. Also, as shown in FIG. 2, ductility about the welding portion was sufficient, and there was no such defects as cracking. In the following are given the data resulting from the chemical components of the weld metal comparing the case of using the above-mentioned welding material with the case of using the already existing flux.

| Flux used | Chemical components of metals to be welded (percent) | | | | | | | | | | Lateral bend test results |
|---|---|---|---|---|---|---|---|---|---|---|---|
| | Cr | Si | Mn | Ni | Al | Ti | Cb | N | C | Fe | |
| Conventionally used flux | 130 | 1.3 | 0.5 | 0.1 | | | | 0.02 | 0.12 | Balance | Crack occurred at 5–10° C. |
| Flux in this invention | 141 | 0.5 | 1.2 | 0.7 | 0.03 | 0.08 | 1.0 | 0.05 | 0.09 | do | 180° C., well bending. |

EXAMPLE 2

(When alloy elements are added only to the band electrode)

1. Material to be welded
a. flux to be used
calcium carbonate   46 percent
alumina   39 percent
fluorite   4 percent
magnesia   7.5 percent
metallic chromium   3.5 percent When water glass was added to these raw materials, which were mixed well, and were sintered at a temperature of 450° C.

b. band electrode to be used (0.4×50 mm.)
Cr   16.3 percent
Al   1.1 percent
Ti   0.8 percent
Cb   1.5 percent
N   0.06 percent
Ni   1.0 percent
Mn   2.1 percent
C   0.06 percent
Si   0.5 percent
Fe   Balance c. Base metal to be used
Same as in example 1

2. Welding conditions
Same as in example 1

Weld metals of superior quality having almost the same components as those in example were obtained. Both ductility and crack resisting property were also excellent.

EXAMPLE 3

(When alloy elements are partly added to the band electrode, and partly to the flux)

1. Material to be used
a. flux to be used
calcium carbonate   35 percent
alumina   31 percent
fluorite   3.5 percent
magnesia   4.5 percent
ferroaluminum (50 percent Al)   3 percent
ferrotitanium (45 percent Ti)   3 percent
metallic chromium   20 percent Water glass was added to these raw materials, which were mixed well, and were sintered at a temperature of 450° C.

b. band electrode to be used (0.4×50 mm.)
Cr   13.5 percent
Cb   1.5 percent
N   0.06 percent
Ni   1.2 percent
Mn   2.0 percent
Si   0.5 percent
C   0.05 percent
Fe   Balance c. base material to be used
Same as in examples 1 and 2

2. Welding conditions
850 AC DC Adverse Polarity)×28 v.×17 cm./min.

Superior weld metals as in the previously given examples were obtained. Both ductility and crack resisting property were excellent.

1. Range of chemical components of the weld metals
aluminum   0.015—0.15 percent
titanium   0.025—0.22 percent
columbium   0.35—2.8 percent
nitrogen   0.01—0.075 percent
chromium   8.5—25 percent
manganese   0.15—2.0 percent
nickel or cobalt   0.15—2.8 percent Incidentally, aluminum referred to in the above represents soluble aluminum. Soluble aluminum generally referred to in analytical chemistry indicates acid-soluble aluminum present in iron and steel, that is, the one readily soluble in such mineral acids as hydrochloric acid and sulfuric acid. In terms of physicochemistry, it means the aggregate of aluminum in the form of atoms present in magnetite in solid solution, aluminum in the state of nitride and aluminum in the state of sulfide. From this reason, $Al_2O_3$ or the like in steel does not fall under such category.

2. Yield of alloy elements
a. When the alloy elements are added to the flux
aluminum   about 3 percent
titanium   2—5 percent
columbium   35—40 percent
nitrogen   30—40 percent
chromium   about 80 percent
manganese   15—30 percent
nickel or cobalt   30—55 percent b. When the alloy elements are added to the band electrode
aluminum   about 5 percent titanium about 5 percent
columbium about 70 percent
nitrogen about 50 percent
chromium about 75 percent
manganese about 40 percent
nickel or cobalt about 80 percent Yield referred to in the above represents welding ratio with the base metal, an also the ratio of consumption of the strip electrode and flux.

EXAMPLE 4

When the alloy elements are partly added to the band electrode, and partly to the flux)
1. Welding material
 a. flux to be used
  calcium carbonate 26 percent
  alumina 47 percent
  fluorite 8.3 percent
  magnesia 1 percent
  ferroaluminum 8 percent
  ferrotitanium 5.6 percent
  ferrocolumbium 2.0 percent
  metallic nickel 1 percent
  chromium nitride 0.6 percent
 Water glass was added to these raw materials, which were mixed well, and were sintered to be granulated at a temperature of about 450° C.
 b. band electrode to be used (0.4×50 mm.)
  Cr 22 percent
  Si 0.4 percent
  Mn 3.8 percent
  Ni 0.5 percent
  C 0.05 percent
  Cb 0.8 percent
  N 0.12 percent
  Fe Balance
 c. base metal to be used
  C 0.122 percent
  Si 0.2 percent
  Mn 0.7 percent
  Mo 0.5 percent
  Fe Balance
2. Welding conditions
 800 A. DC, Reverse Polarity)×27 v.×16 cm./min.

The Superior welded portion was obtained as was in the previously given examples. Both ductility and crack resisting property were excellent.

EXAMPLE 5

(When the alloy elements are partly added to the bad electrode, and partly to the flux)
1. Material to be welded
 a. flux to be used
  calcium carbonate 29 percent
  alumina 40 percent
  fluorite 2 percent
  magnesia 4 percent
  ferroaluminum 1.5 percent
  ferrotitanium 9 percent
  ferrocolumbium 7.5 percent
  chromium nitride 1.5 percent
  metallic nickel 4 percent
  metallic manganese 1.5 percent
 Water glass was added to these raw materials, which were mixed well, and were sintered to be granulated at a temperature of about 450° C.
 b. band electrode to be used (0.4×50 mm.)
  Cr 17.2 percent
  Si 0.3 percent
  Mn 0.4 percent
  Ni 3.0 percent
  C 0.03 percent
  N 0.01 percent
  Al 2.1 percent
  Fe Balance
 c. base metal to be used
  Same as in example 4.
2. Welding conditions
 850 A. DC, RP)×28 v.×18 cm./min.

A superior welded portion was obtained as in the previously given examples. Both ductility and crack resisting property were also excellent.

EXAMPLE 6

(When the alloy elements are partly added to the band electrode, and partly to the flux)
1. Material to be welded
 a. flux to be used
  calcium carbonate 34 percent
  alumina 43 percent
  fluorite 7 percent
  magnesia 4 percent
  chromium nitride 4 percent
  metallic manganese 6.5 percent
  metallic nickel 1.5 percent
 Water glass was added to these raw materials, which were mixed well, and were sintered to be granulated at a temperature of about 450° C.
 b. band electrode to be used (0.4×50 mm.)
  Cr 18.5 percent
  Si 0.3 percent
  Mn 0.2 percent
  Al 0.5 percent
  Ti 2.5 percent
  Cb 3.5 percent
  C 0.08 percent
  N 0.01 percent
  Fe Balance
 c. base metal to be used
  C 0.24 percent
  Si 0.2 percent
  Mn 0.7 percent
  Fe Balance
2. Welding conditions
 800 A. (DC, RP)×28 n.×14 cm./min.

A superior welded portion was obtained as in the previously given examples. Both the ductility and crack resisting property were also excellent.

We claim:
1. A material for band electrode submerged arc-welding of chromium stainless steel comprising a combination of a band electrode of chromium stainless steel and a flux containing essentially 25—50 percent calcium carbonate, 30—50 percent alumina, 1—10 percent fluorite, 1—10 percent magnesia, 0.5—5 percent aluminum, 1—5 percent titanium, 1—7 percent columbium, 0.025—0.25 percent nitrogen, not more than 30 percent chromium, 1—7 percent manganese and 0.5—5 percent nickel or cobalt.